US012559171B2

(12) United States Patent　　　　(10) Patent No.:　US 12,559,171 B2
Igarashi　　　　　　　　　　　　　　(45) Date of Patent:　　Feb. 24, 2026

(54) AUTOMATIC STEERING CONTROL APPARATUS, AUTOMATIC STEERING CONTROL METHOD, AND NON-TRANSITORY RECORDING MEDIUM

(71) Applicant: SUBARU CORPORATION, Tokyo (JP)

(72) Inventor: Yoshiyuki Igarashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 332 days.

(21) Appl. No.: 18/181,993

(22) Filed: Mar. 10, 2023

(65) Prior Publication Data

US 2023/0311980 A1　　Oct. 5, 2023

(30) Foreign Application Priority Data

Mar. 29, 2022　(JP) ................................. 2022-053663

(51) Int. Cl.
　　*B62D 1/00*　　　(2006.01)
　　*B62D 6/00*　　　(2006.01)
　　*B62D 15/02*　　(2006.01)
(52) U.S. Cl.
　　CPC ............. *B62D 6/006* (2013.01); *B62D 15/02* (2013.01)
(58) Field of Classification Search
　　CPC .... B62D 6/006; B62D 15/02; B62D 15/0255; B62D 1/286; B62D 1/00
　　USPC ........................................................ 701/41
　　See application file for complete search history.

(56) References Cited

U.S. PATENT DOCUMENTS

| | | | | |
|---|---|---|---|---|
| 2014/0052313 | A1* | 2/2014 | Wolterman | .............. B60Q 1/40 701/2 |
| 2015/0344066 | A1* | 12/2015 | Tsubaki | .............. G05D 1/0061 701/41 |
| 2016/0176400 | A1 | 6/2016 | Nakano et al. | |
| 2021/0339773 | A1* | 11/2021 | Lee | ..................... B62D 15/025 |

FOREIGN PATENT DOCUMENTS

| | | |
|---|---|---|
| JP | 2015-020719 A | 2/2015 |
| JP | 2015-205558 A | 11/2015 |
| JP | 2020-032949 A | 3/2020 |

OTHER PUBLICATIONS

Notice of Reasons for Refusal received in corresponding Japanese Patent Application No. 2022-053663, dated Oct. 28, 2025.

* cited by examiner

*Primary Examiner* — Shardul D Patel
(74) *Attorney, Agent, or Firm* — Rimon P.C.

(57) ABSTRACT

An automatic steering control apparatus includes a steering torque detector and a steering processor. The steering torque detector is configured to detect a steering torque amount applied to a steering shaft of a vehicle. The steering processor is configured to switch between an automatic steering and a manual steering. The steering processor is configured to calculate an integration value in which the steering torque amount detected by the steering torque detector is integrated for a predetermined period, and switch the automatic steering to the manual steering when the integration value exceeds an integration threshold.

14 Claims, 7 Drawing Sheets

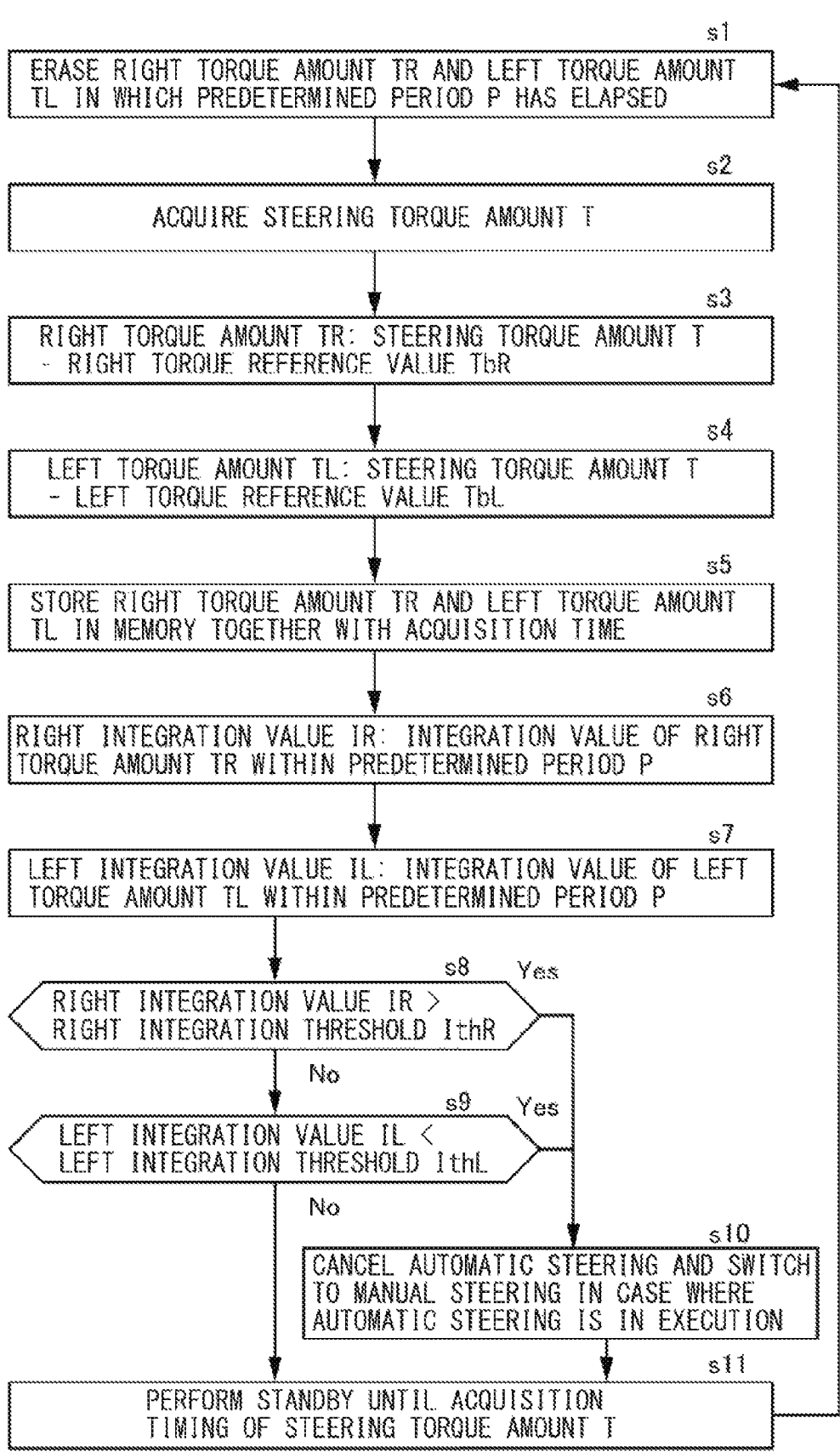

s1
ERASE RIGHT TORQUE AMOUNT TR AND LEFT TORQUE AMOUNT
TL IN WHICH PREDETERMINED PERIOD P HAS ELAPSED s2
ACQUIRE STEERING TORQUE AMOUNT T s3
RIGHT TORQUE AMOUNT TR: STEERING TORQUE AMOUNT T
- RIGHT TORQUE REFERENCE VALUE TbR s4
LEFT TORQUE AMOUNT TL: STEERING TORQUE AMOUNT T
- LEFT TORQUE REFERENCE VALUE TbL s5
STORE RIGHT TORQUE AMOUNT TR AND LEFT TORQUE AMOUNT
TL IN MEMORY TOGETHER WITH ACQUISITION TIME s6
RIGHT INTEGRATION VALUE IR: INTEGRATION VALUE OF RIGHT
TORQUE AMOUNT TR WITHIN PREDETERMINED PERIOD P s7
LEFT INTEGRATION VALUE IL: INTEGRATION VALUE OF LEFT
TORQUE AMOUNT TL WITHIN PREDETERMINED PERIOD P s8        Yes
RIGHT INTEGRATION VALUE IR >
RIGHT INTEGRATION THRESHOLD IthR

No s9        Yes
LEFT INTEGRATION VALUE IL <
LEFT INTEGRATION THRESHOLD IthL

No s10
CANCEL AUTOMATIC STEERING AND SWITCH
TO MANUAL STEERING IN CASE WHERE
AUTOMATIC STEERING IS IN EXECUTION s11
PERFORM STANDBY UNTIL ACQUISITION
TIMING OF STEERING TORQUE AMOUNT T

FIG. 7

RIGHT TORQUE REFERENCE VALUE TbR: 1.5
LEFT TORQUE REFERENCE VALUE TbL :-1.5

| ACQUISITION TIME | n-1 | n | n+1 | n+2 | ... | n+11 | ... | n+40 | ... | n+50 |
|---|---|---|---|---|---|---|---|---|---|---|
| STEERING TORQUE AMOUNT T | 1.1 | 1.1 | 1.0 | 0.9 | ... | 1.3 | ... | 3.6 | ... | 4.5 |
| RIGHT TORQUE AMOUNT TR | -0.4 | -0.4 | -0.5 | -0.6 | ... | -0.2 | ... | 2.1 | ... | 3.0 |
| LEFT TORQUE AMOUNT TL | 2.6 | 2.6 | 2.5 | 2.4 | ... | 2.8 | ... | 5.1 | ... | 6.0 |

STORED DATA AT n+40
P

STORED DATA AT n+50
P

AUTOMATIC STEERING CONTROL APPARATUS, AUTOMATIC STEERING CONTROL METHOD, AND NON-TRANSITORY RECORDING MEDIUM

CROSS-REFERENCE TO RELATED APPLICATIONS

The present application claims priority from Japanese Patent Application No. 2022-053663 filed on Mar. 29, 2022, the entire contents of which are hereby incorporated by reference.

BACKGROUND

The disclosure relates to an automatic steering control apparatus, an automatic steering control method, and a non-transitory recording medium containing an automatic steering control program that assist traveling of a vehicle.

A technique related to a lane keep control that keeps an own vehicle within a lane has been developed and put into practical use in recent years for a vehicle such as an automobile. A technique has been also developed related to a lane change control that causes the own vehicle to change lanes to an adjacent lane, without an operation of a steering wheel by a driver who drives the own vehicle.

A system for an automatic steering control that performs a driving assist control such as the lane keep control or the lane change control has an override functionality. The override temporarily stops the driving assist control or limits a control amount of the driving assist control by giving priority to an intention of the driver and thereby switches to driving that is primarily based on a manual operation to be performed by the driver, in a case where the driver has performed a predetermined driving operation during execution of the driving assist control. For example, Japanese Unexamined Patent Application Publication (JP-A) No. 2015-205558 discloses, as a kind of the automatic steering control, a traveling assist apparatus adapted to determine that a steering assist by a lane change unit is to be discontinued in a case where an amount of steering performed by the driver has exceeded a preset lane keep discontinuation threshold.

SUMMARY

An aspect of the disclosure provides an automatic steering control apparatus that includes a steering torque detector and a steering processor. The steering torque detector is configured to detect a steering torque amount applied to a steering shaft of a vehicle. The steering processor is configured to switch between an automatic steering and a manual steering. The steering processor is configured to calculate an integration value in which the steering torque amount detected by the steering torque detector is integrated for a predetermined period, and switch the automatic steering to the manual steering when the integration value exceeds an integration threshold.

An aspect of the disclosure provides an automatic steering control method that includes: calculating, with a computer, an integration value in which a steering torque amount applied to a steering shaft of a vehicle is integrated for a predetermined period; and switching, with the computer, an automatic steering to a manual steering when the integration value exceeds an integration threshold.

An aspect of the disclosure provides a non-transitory computer readable medium containing an automatic steering control program. The automatic steering control program causes, when executed by a computer, the computer to implement a method that includes: calculating an integration value in which a steering torque amount applied to a steering shaft of a vehicle is integrated for a predetermined period; and switching an automatic steering to a manual steering when the integration value exceeds an integration threshold.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 7 is a flowchart illustrating a process of switching the automatic steering to the manual steering, according to one example embodiment.

DETAILED DESCRIPTION

Figure 1:
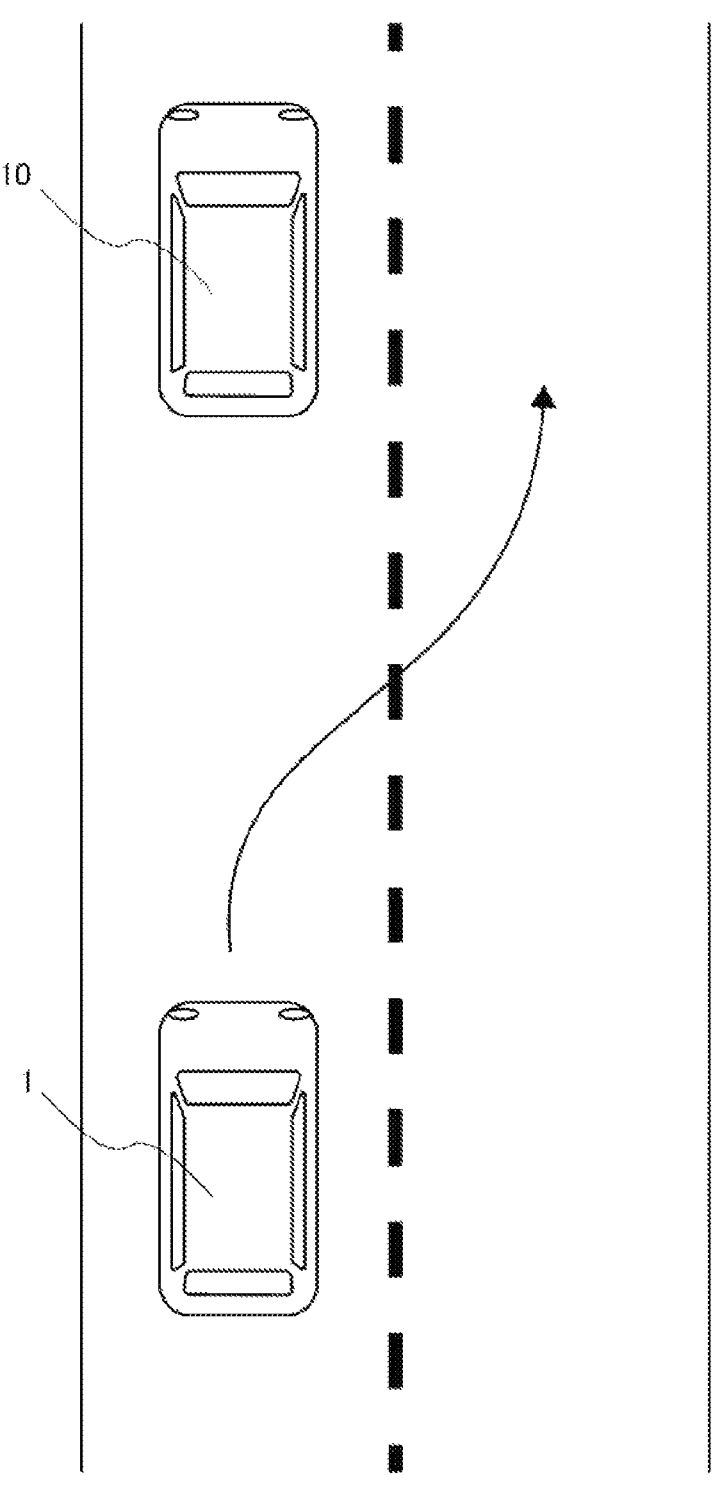
FIG. 1 is a diagram illustrating a situation in which a vehicle makes lane changes.

A traveling assist apparatus disclosed in JP-A No. 2015-205558 detects, as an amount of steering performed by a driver who drives a vehicle, a steering torque amount which is a torque amount generated at a steering shaft. Using the steering torque amount for an override and so configuring as to stop an automatic steering control in a case where the steering torque amount is equal to or greater than a threshold have revealed that a sense of discomfort occurs in which the automatic steering control makes a slow response to an operation performed the driver until the steering torque amount reaches a predetermined threshold, and in which the automatic steering control makes the response at once when the steering torque amount reaches the predetermined threshold. A cancellation of the automatic steering control unintended by the driver can occur easily if the threshold of the steering torque amount is set to a small value, meaning that the threshold is to be set to a reasonably large value. On the other hand, in a case where the driver attempts to perform the steering wheel operation by himself/herself, a steering wheel operation performed by the automatic steering control is cancelled when the steering torque amount that exceeds the large threshold is applied. These can presumably lead to a delay in the cancellation of the automatic steering control and can presumably give to the driver the sense of discomfort described above.

It is desirable to provide an automatic steering control apparatus, an automatic steering control method, and a non-transitory recording medium containing an automatic steering control program that make it possible to reduce a possibility of giving, to a driver who drives a vehicle, a sense of discomfort upon cancelling an automatic steering control.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Described is an example embodiment applied to an automatic steering based on a blinker operation. FIG. 1 is a top diagram illustrating a road on which a vehicle 1 and a front vehicle 10 that travels in front of the vehicle 1 travel, and illustrating a situation in which the vehicle 1 makes lane changes. Lines drawn on a road surface may include a center line and lane lines. In the example embodiment, an automatic steering control apparatus may switch from a manual steering or an automatic steering based on a lane keep control to an automatic steering directed to lane change, in a case where a driver who rides the vehicle 1 operates a blinker in a right direction upon overtaking the front vehicle 10. Thus, a steering wheel 2 of the vehicle 1 may be automatically turned in the right direction to cause the vehicle 1 to travel on the right, and the steering wheel 2 may be thereafter automatically turned in the left direction to change lanes. Accordingly, the vehicle 1 may make the lane changes to a right-side lane as denoted by an arrow in FIG. 1.

Figure 2:
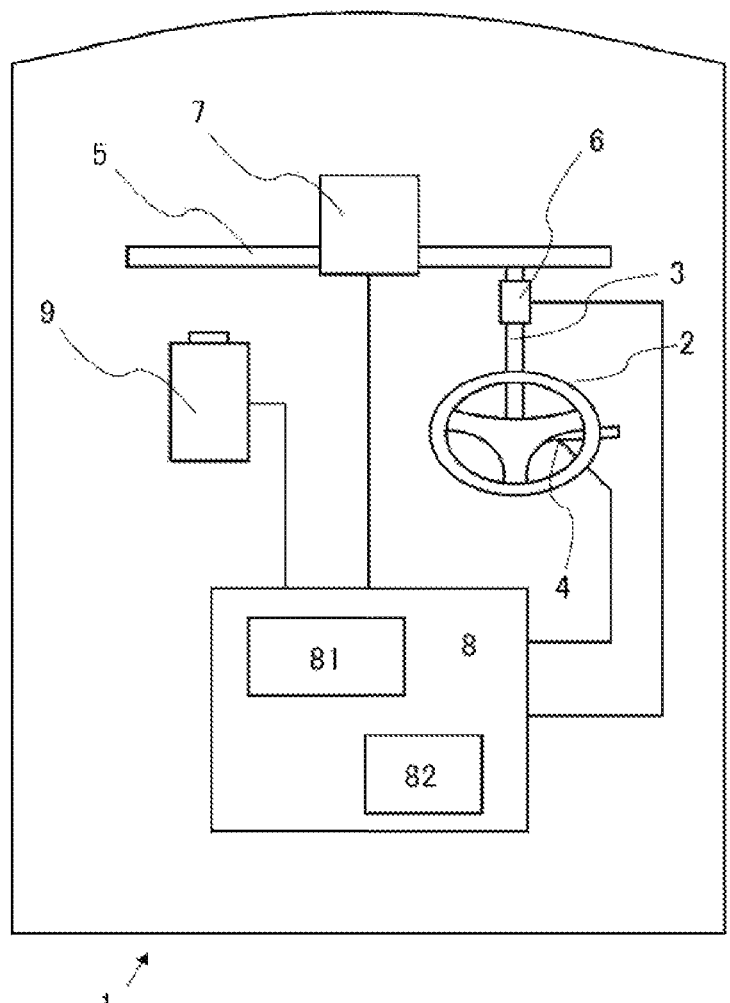
FIG. 2 is a system configuration diagram illustrating an automatic steering control apparatus mounted on the vehicle according to one example embodiment of the disclosure.

Referring to FIG. 2, the steering wheel 2 of the vehicle 1 may be coupled to a steering shaft 3. A blinker switch 4 coupled to a blinker bar may be provided in the vicinity of the steering wheel 2. The steering shaft 3 may be coupled to a rod 5 adapted to change a direction of front wheels. The steering shaft 3 may be provided with a torque sensor 6 configured to detect a torque. In one embodiment, the torque sensor 6 may serve as a "steering torque detector".

The rod 5 may move by a force applied by the steering shaft 3 and a steering driver 7 to change the direction of the front wheels. The torque sensor 6 may detect a steering torque amount applied to the steering shaft 3, and transmit the detected steering torque amount to a steering processor 8. In some embodiments, the steering processor 8 may be an ECU. The steering processor 8 may include one or more processors 81 and one or more memories 82 communicably coupled to the one or more processors 81. In some embodiments, the steering processor 8 may be a plurality of ECUs that works in cooperation with each other. The blinker switch 4 may be coupled to the steering processor 8, and may transmit, to the steering processor 8, pieces of data indicating three states, including a state in which the blinker is off, a state in which the right blinker is on, and a state in which the left blinker is on. The steering processor 8 may control the steering driver 7 to move the rod 5 and thereby change a direction of the unillustrated front wheels. Thus, the steering processor 8 may control a traveling direction of the vehicle 1. At this time, the steering shaft 3 and the steering wheel 2 may rotate as well. The steering driver 7 may serve as a drive device of a power steering.

In a case where the driver operates the blinker to turn on the right blinker while the vehicle 1 travels as illustrated in FIG. 1, the blinker switch 4 may output, to the steering processor 8, the data indicating the state of the right blinker. In a case where the steering processor 8 receives the data, the steering processor 8 may start a control of the automatic steering that performs the lane changes. The steering processor 8 may start the control of the automatic steering directed to the lane changes, on the basis of the operation of the blinker performed by the driver as a trigger. The steering processor 8 may analyze an image of the front vehicle 10 and the lines drawn on the road surface acquired by a camera 9 to create steering data, and transmit the steering data to the steering driver 7. The steering driver 7 may move the rod 5 on the basis of the steering data to change the direction of the front wheels. Thus, the vehicle 1 may move to the right-side lane as illustrated by the arrow in FIG. 1 by the automatic steering directed to the lane changes simply by the operation of the blinker performed by the driver, without the manual steering of the steering wheel 2 to be performed by the driver.

However, the driver may sometimes make the lane changes by his/her own operation by applying a force to the steering wheel 2, immediately after operating the blinker. In such a case, the steering processor 8 is to cancel the automatic steering. In a case where the driver so applies the force to the steering wheel 2 as to turn the steering wheel 2 to the right to steer with the right blinker being turned on by the blinker switch 4 as a result of the operation of the blinker by the driver, the steering torque may be generated at the steering shaft 3. The steering torque may be detected by the torque sensor 6, and torque data may be transmitted to the steering processor 8. Thereafter, the processor 81 of the steering processor 8 may end the automatic steering, and may switch to the manual steering.

Figure 3:
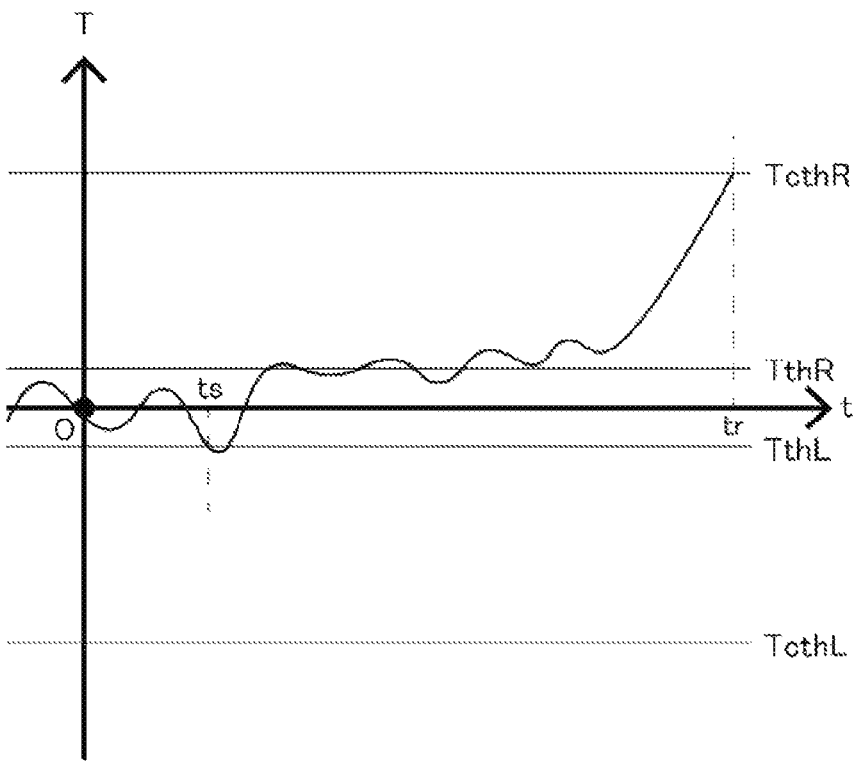
FIG. 3 is a graph illustrating a time change in a steering torque amount according to a comparative example.

Described now is the switching to the manual steering according to the example embodiment with reference to a graph that illustrates a time change in a steering torque amount T. FIG. 3 is a graph illustrating, for each time, the steering torque amount T detected by the torque sensor 6 and received by the steering processor 8. A vertical axis represents the steering torque amount T, and a horizontal axis represents a time t. A time at an origin O may be any set time. An upper side of the graph represents a torque in a direction of turning the steering wheel 2 to the right side. A lower side of the graph represents a torque in a direction of turning the steering wheel 2 to the left side. A curve in the graph represents the steering torque amount T at each time. The steering torque amount T may become plus (+) by the torque in the direction that turns the steering wheel 2 to the right, and may become minus (−) by the torque in the direction that turns the steering wheel 2 to the left. In the example embodiment, the steering torque amount T may be a digital value, although the steering torque amount T is illustrated in an analog fashion in the graph illustrated in FIG. 3 or other drawings.

In an example illustrated in FIG. 3, the steering torque amount T that turns the steering wheel 2 to the right and the left is generated, following which the large steering torque amount T that turns the steering wheel 2 to the right is generated. A period of time on a right side of FIG. 3 during which the steering torque amount T is large is a state in which the driver applies a large force to the steering wheel 2 to turn the steering wheel 2 to the right in an attempt to make the lane changes to the right side by himself/herself, under a situation where the automatic steering is performed in the right direction by the operation of the blinker. TcthR denotes a right torque threshold according to a comparative example, and TcthL denotes a left torque threshold according to the comparative example. The right torque threshold TcthR and the left torque threshold TcthL are each set to any value and so set that their respective absolute values become the same, but may be so set that their respective absolute values become different from each other.

In the comparative example, the steering processor 8 cancels the automatic steering to switch to the manual steering at a time point at which the large steering torque amount T is generated that exceeds the right torque threshold TcthR upon the automatic steering. In FIG. 3 according to the comparative example, the automatic steering is cancelled at a time point tr at which the steering torque amount T exceeds the right torque threshold TcthR. Further, although unillustrated, the automatic steering is canceled to switch to the manual steering in a case where the large steering torque amount T is generated in the minus direction that exceeds the left torque threshold TcthL. The steering torque amount T in the minus direction is generated at the time when a force is applied to the steering wheel 2 to turn the steering wheel 2 to the left. In addition, when the steering wheel 2 tries or starts to rotate to the right by the automatic steering, the steering torque amount T in the minus direction is generated by applying a force to the steering wheel 2 in an attempt to stop the rotation.

If the steering processor 8 is adapted to cancel the automatic steering at the time when the steering torque amount T that exceeds the right torque threshold TcthR or the left torque threshold TcthL is generated, the driver can feel a sense of discomfort in which the automatic steering makes a slow response to the operation of the steering wheel 2 until the steering torque amount T reaches the predetermined threshold, and in which the automatic steering makes the response at once when the steering torque amount T reaches the predetermined threshold. Accordingly, setting the torque threshold that allows the automatic steering to be cancelled to a small value as with the right torque threshold TthR and the left torque threshold TthL illustrated in FIG. 3 makes the automatic steering easily cancelled, which in turn makes the sense of discomfort to be felt by the driver small. However, this can cancel the automatic steering and switch to the manual steering at a time point Ts illustrated in FIG. 3 at which the driver has no intention of steering manually. Hence, the small right torque threshold TthR and the small left torque threshold TthL as illustrated in FIG. 3 may not be used.

Figure 4:
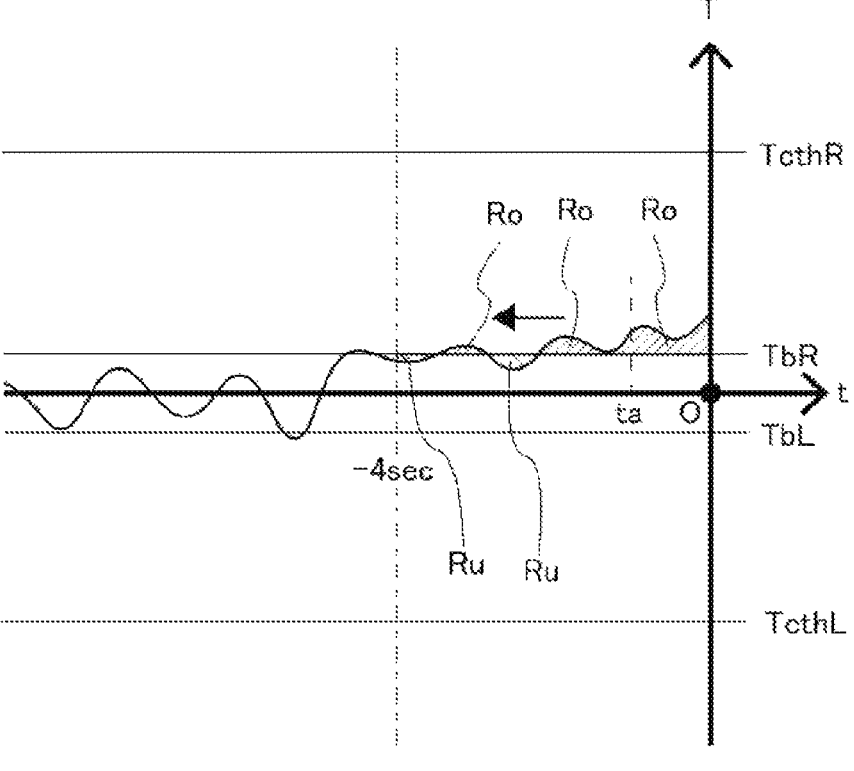
FIG. 4 is a graph illustrating a past time change in the steering torque amount with a present time point being an origin, according to one example embodiment.
Figures 5, 6:
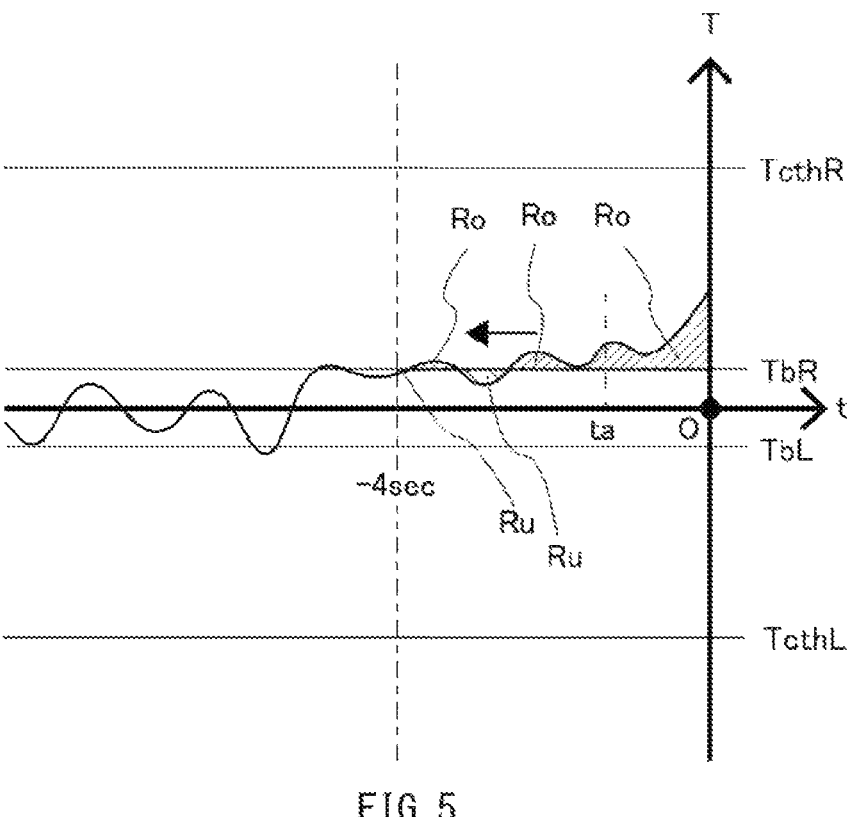
FIG. 5 is a graph illustrating a past time change in the steering torque amount at a time point at which a time has elapsed from the time point illustrated in FIG. 4.
FIG. 6 is a graph illustrating a past time change in the steering torque amount at a time point at which an automatic steering is switched to a manual steering, according to one example embodiment.

Accordingly, in the example embodiment of the disclosure, the steering processor 8 calculates an integration value in which the steering torque amount detected by the steering torque detector is integrated for a predetermined period P, and switches the automatic steering to the manual steering in a case where the integration value exceeds an integration threshold. An example of this control is now described with reference to FIGS. 4 and 5. FIGS. 4 and 5 are each a graph in which a present time point is the origin O unlike FIG. 3. The origin O as the present time point shifts to the right side with respect to a curve of the steering torque amount T as a time elapses. Accordingly, fixing the origin O results in shifting of the curve of the steering torque amount T in a direction of an arrow in FIG. 4. FIG. 5 is a graph in which the time has elapsed from FIG. 4 and the curve of the steering torque amount T has shifted in the arrow direction. A time "ta" at which the steering torque amount T is acquired, which is denoted by a dotted line, is shifted in the arrow direction. In an example illustrated by the graphs of FIGS. 4 and 5, the predetermined period P may be 4 seconds as denoted by a chain line. The steering processor 8 may perform integration of the steering torque amount T for 4 seconds before the origin O corresponding to the present time point to thereby obtain the integration value.

In the example embodiment, the steering processor 8 may convert the steering torque amount T on the basis of a torque reference value as a reference. In the graphs illustrated in FIGS. 4 and 5, between a location corresponding to −4 sec and the origin O, the steering processor 8 may set, as a right integration value IR, a value as a resultant of subtracting an integration value that corresponds to the area of a region Ru in which the steering torque amount T is less than a right torque reference value TbR from an integration value that corresponds to the area of a region Ro in which the steering torque amount T is greater than the right torque reference value TbR. Further, the steering processor 8 may cancel the automatic steering to switch to the manual steering in a case where the right integration value IR exceeds a right integration threshold IthR. In the graph illustrated in FIG. 4, a change between the integration value of the region Ro that exceeds beyond the right torque reference value TbR toward a + (plus) side and the integration value of the region Ru on a − (minus) side is little, and the right integration value IR in which the integration value of the region Ru is subtracted from the integration value of the region Ro does not exceed the right integration threshold IthR. Accordingly, the automatic steering may not be cancelled.

In the graph illustrated in FIG. 5, the integration value of the region Ro that exceeds the right torque reference value TbR toward the + side is greater than the integration value of the region Ru on the − side, and the right integration value IR in which the integration value of the region Ru is subtracted from the integration value of the region Ro exceeds the right integration threshold IthR. Accordingly, the automatic steering may be cancelled. For example, a state illustrated in FIG. 5 is established and the automatic steering may be cancelled accordingly in a case where the driver attempts to turn the steering wheel 2 to the right faster than the automatic steering, with the automatic steering to change the lanes performed by the automatic steering control apparatus being executed in response to a driver's operation of turning on the right blinker. This configuration helps to make the steering torque amount T at the time when the automatic steering is cancelled smaller than the right torque threshold TcthR illustrated in FIG. 3 and to make the sense of discomfort to be given to the driver small.

FIG. 5 illustrates the cancellation of the automatic steering in a case where the driver has attempted to turn the steering wheel 2 to the right faster than the automatic steering. FIG. 6 illustrates the cancellation of the automatic steering in a case where the driver has withdrawn from making the lane changes to the right. In a case where the driver turns on the right blinker and the automatic steering control apparatus executes the automatic steering to change the lanes, the steering processor 8 may control the steering driver 7 to cause the steering shaft 3 to rotate to the right and thereby to make the lane changes. At this time, in a case where the driver stops the right turning of the steering wheel 2, a torque in the left direction may be generated at the torque sensor 6. The thus-generated torque may be detected as the steering torque amount T having a − (minus) value, and the detected steering torque amount T may be transmitted to the steering processor 8.

In the graph illustrated in FIG. 6, the integration value of the region Ro that exceeds a left torque reference value TbL toward the − side is greater than the integration value of the region Ru on the + side, and the left integration value IL exceeds a left integration threshold IthL. Accordingly, the automatic steering may be cancelled and switched to the manual operation. For example, a state illustrated in FIG. 6 is established and the automatic steering may be cancelled accordingly in a case where the driver has stopped the right turning of the steering wheel 2 based on the automatic steering, with the automatic steering being executed in response to the driver's operation of turning on the right blinker. This configuration also helps to make the sense of discomfort to be given to the driver at this time smaller than a case where the left torque threshold TcthL is used. In the example embodiment, the steering processor 8 may use the region Ro and the region Ru for the integration. In some embodiments, the steering processor 8 may perform the integration on the basis of the steering torque amount T that exceeds the right torque reference value TbR or the left torque reference value TbL in a direction away from an intermediate value of the right torque reference value TbR and the left torque reference value TbL, and on the basis of the steering torque amount T that does not exceed the right torque reference value TbR or the left torque reference value TbL.

Described next is a process of cancelling the automatic steering according to the example embodiment. FIG. 7 is a flowchart illustrating an example of the process of cancelling the automatic steering to be executed by the steering processor 8 in the vehicle 1 having an automatic steering operation. This process may be a process in a case where the steering processor 8 cancels the automatic steering directed to the lane changes, and a process in a case where the steering processor 8 cancels the automatic steering directed to a lane keep as well. The flowchart illustrated by way of example in FIG. 7 may embody an automatic steering control method or a non-transitory recording medium containing an automatic steering control program according to one embodiment of the disclosure.

The right integration threshold IthR and the left integration threshold IthL may be set in advance and stored in the memory 82 of the steering processor 8. The right integration threshold IthR may have a +(plus) value and the left integration value IthL may have a − (minus) value. An absolute value of the right integration threshold IthR and an absolute value of the left integration threshold IthL may be set to the same value as each other, or may be set to different values from each other. Upon start-up of the vehicle 1, the steering processor 8 may start a process from step s1. In step s1, the steering processor 8 may erase data in which the predetermined period P has elapsed, from a right torque amount TR and a left torque amount TL stored in the memory 82. Data on the right torque amount TR and data on the left torque amount TL may be stored in the memory 82 together with a time at which the data is acquired, i.e., an acquisition time.

Thereafter, in step s2, the steering processor 8 may acquire data on the steering torque amount T from the torque sensor 6. Thereafter, in step s3, the steering processor 8 may subtract the right torque reference value TbR illustrated in FIGS. 4 and 5 from the steering torque amount T to obtain the right torque amount TR. In step s4, the steering processor 8 may subtract the left torque reference value TbL illustrated in FIGS. 4 and 5 from the steering torque amount T to obtain the left torque amount TL. Thereafter, in step s5, the steering processor 8 may store the right torque amount TR and the left torque amount TL in the memory 82 together with the acquisition time.

Accordingly, the data on the right torque amount TR and the data on the left torque amount TL may be stored together with the acquisition time for multiple times. Thereafter, in step s6, the steering processor 8 may integrate the right torque amount TR within the predetermined period P, and may set the integration value thereof as the right integration value IR. In step s7, the steering processor 8 may integrate the left torque amount TL within the predetermined period P, and may set the integration value thereof as the left integration value IL. In the example embodiment, the predetermined period P may be 4 seconds without limitation.

Thereafter, in step s8, the process may proceed to step s10 if the right integration value IR is greater than the preset right integration threshold IthR stored in the memory 82. The process may proceed to step s9 if the right integration value IR is not greater than the right integration threshold IthR. As described with reference to FIG. 6, the left integration value IL may have the − (minus) value upon the cancellation of the automatic steering in response to the left torque. The left integration threshold IthL may also be − (minus). In step s9, the process may proceed to step s10 if the left integration value IL is less than the left integration threshold IthL stored in the memory 82 and having the − (minus) value. The process may proceed to step s11 if the left integration value IL is not less than the left integration threshold IthL.

Thereafter, in step s10, the steering processor 8 may cancel the automatic steering to switch to the manual steering in a case where the automatic steering is in execution, following which the process may proceed to step s11.

The acquisition of the steering torque amount T by the steering processor 8 from the torque sensor 6 may be performed at a torque acquisition timing for each constant time. In step s11, the steering processor 8 may stand by until the acquisition timing of the steering torque amount T. The process may proceed to step s1 at the torque acquisition timing.

The automatic steering control program that involves the above example process may be stored in the memory 82, and an operation based on the automatic steering control program may be implemented by the processor 81 of the steering processor 8. In some embodiments, the steering processor 8 may be a computer. As a result of a digital process, the steering torque amount T may have a digital value, and the acquisition timing of the steering torque amount T may be discrete. The integration value of the region Ro and the integration value of the region Ru illustrated in FIGS. 5 and 6 may be acquired as discrete data.

Figure 8:
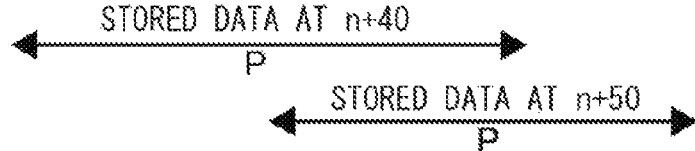
FIG. 8 is a table illustrating an example of pieces of data on a right torque amount TR and a left torque amount TL stored in a memory, according to one example embodiment.

FIG. 8 illustrates an example of pieces of data on the steering torque amount T stored in the memory 82 according to the example embodiment. FIG. 8 illustrates an example of pieces of data on the right torque amount TR and the left torque amount TL obtained as a result of acquiring the steering torque amount T at each acquisition time from n−1 to n+50, subtracting the torque reference values from the steering torque amount T, and storing the torque amounts. Although the steering torque amount T may not be stored in the memory 82, FIG. 8 illustrates the steering torque amount T for description purpose. The right torque reference value TbR may be 1.5, and the left torque reference value TbL may be −1.5. The steering torque amount T at the acquisition time "n" may be 1.1, the right torque amount TR at the acquisition time n may be 1.1−1.5=−0.4, and the left torque amount TL at the acquisition time n may be 1.1−(−1.5)=2.6. The table illustrated by way of example in FIG. 8 illustrates a state in which the driver has applied a right torque that is smaller than the right torque reference value TbR to the steering wheel 2, and thereafter has applied the large right torque. It should be noted that the data values illustrated in FIG. 8 are different from the values of the graphs illustrated in FIGS. 3 to 6.

At the time of n+40, the pieces of data on the right torque amount TR and the left torque amount TL at the 40 acquisition times from n+1 to n+40 may be stored in the memory 82. The 40 acquisition times from n+1 to n+40 may correspond to the predetermined period P. The pieces of data at and before the acquisition time of n may be erased in step s1. The pieces of data on and after the acquisition time of n+41 may not be stored yet. All of the pieces of data on the right torque amount TR at the 40 acquisition times from n+1 to n+40 may be added in step s6 to serve as the right integration value IR. The right integration value IR may be compared with the right integration threshold IthR in step s8.

At the time of n+50 in which the time is advanced by 1 (one) second, the pieces of data on the right torque amount TR and the left torque amount TL at the 40 acquisition times from n+11 to n+50 may be stored in the memory 82. The 40 acquisition times from n+11 to n+50 may correspond to the predetermined period P. The pieces of data at and before the acquisition time of n+10 may be erased in step s1. All of the pieces of data on the right torque amount TR at the 40 acquisition times from n+11 to n+50 may be added in step s6 to serve as the right integration value IR. The right integration value IR may be compared with the right integration threshold IthR in step s8.

The storing and the erasure of the data may be similarly performed for the left torque amount TL as well. The left integration value IL may be calculated on the basis of the integration value of the left torque amounts TL within the predetermined period P, and the left integration value IL may be compared with the left integration threshold IthL in step s9.

In the example embodiment, the right torque reference value TbR and the left torque reference value TbL may be provided as the torque reference values, and the right torque amount TR and the left torque amount TL may be calculated on the basis of the steering torque amount T. This biases the integration value and helps to make it difficult to cause the cancellation of the automatic steering unintended by the driver. In some embodiments, a control that cancels the automatic steering may be performed in which the integration value integrated for the predetermined period P may be calculated and the thus-calculated integration value may be compared with the integration threshold, without providing the torque reference value.

In the example embodiment, the acquired pieces of data within the predetermined period P from the present time point may be integrated as they are. In some embodiments, each acquired data may be weighted, following which the weighted data may be subjected to the integration. For example, in a case where the data is acquired for each 10 ms as with the example embodiment, 40 steering torque amounts T may be acquired in an example case where the predetermined period P is 4 seconds. In this case, thus-acquired pieces of data may be multiplied by a coefficient to perform the weighting. For example, the right torque amount TR and the left torque amount TL may be stored in the memory 82 together with the acquisition time as illustrated in FIG. 8. Thereafter, the right torque amount TR and the left torque amount TL may be added after performing the weighting of 1.00, 0.98, 0.96, and so forth in the order of the right torque amount TR in which the acquisition time is new and in the order of the left torque amount TL in which the acquisition time is new to obtain the right integration value IR and the left integration value IL. In this example, the acquired data may become old as the time of the present time point advances, and the weighting to be performed on each of the pieces of data differs depending on the oldness of the acquired data. For example, the weighting for n+39 may be 0.98 in a case where the present time point is n+40, and the weighting for n+49 may be 0.98 in a case where the present time point is n+50. In some embodiments where the weighting is used as described above, the right torque amount TR in which the acquisition time is new and the left torque amount TL in which the acquisition time is new may be highly weighted.

First Modification Example

Figure 9:
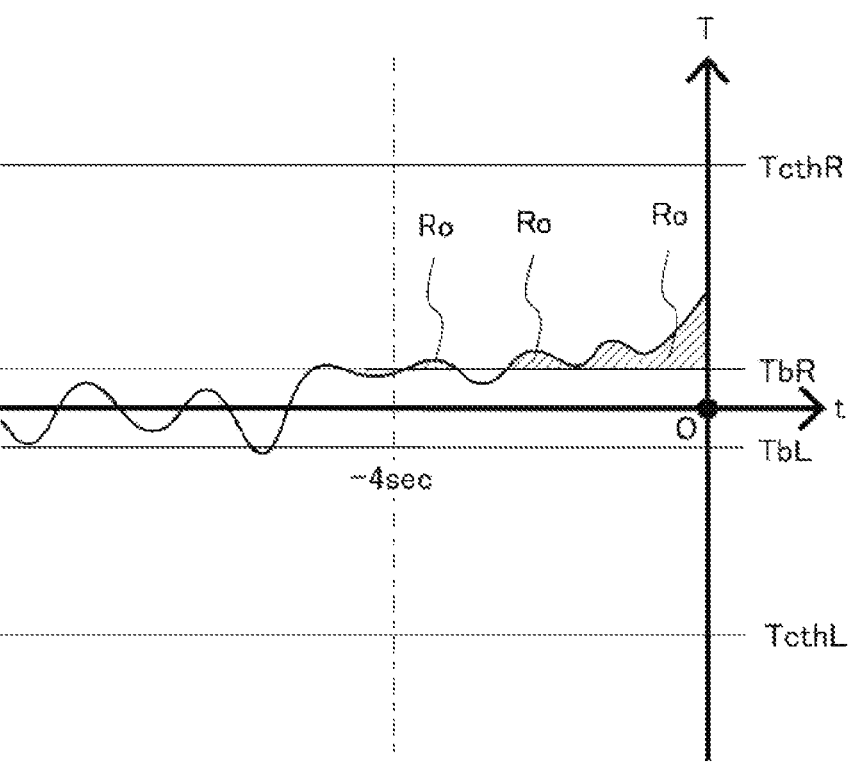
FIG. 9 is a graph illustrating a past time change in the steering torque amount at a time point at which the automatic steering is switched to the manual steering, according to a first modification example.

In the example embodiment described above, the right integration value IR may be obtained by subtracting the region Ru on the − side from the region Ro that exceeds the right torque reference value TbR toward the + side, and the left integration value IL may be obtained similarly on the basis of a reversed sign, as illustrated in FIGS. 4 and 5. In a first modification example, however, the right integration value IR and the left integration value IL may be obtained on the basis of the region Ro, and the region Ru may not be used. FIG. 9 is a graph illustrating an example according to the first modification example. The automatic steering may be cancelled in a case where the right integration value IR in which the shaded region Ro is added exceeds the right integration threshold IthR.

In the first modification example, in step s3 of the flowchart illustrated in FIG. 7, in a case where a value in which the right torque reference value TbR is subtracted from the steering torque amount T is − (minus), the right torque amount TR at that time may be set to zero and stored in the memory 82. This obtains the right integration value IR on the basis of the region Ro illustrated in FIG. 9. For the left torque, in a case where a value in which the left torque reference value TbL is subtracted from the steering torque amount T is +(plus), the left torque amount TL at that time may be set to zero and stored in the memory 82. This obtains the left integration value IL on the basis of the region Ro. Other flows may be similar to those of the example embodiment illustrated in FIG. 7.

The first modification example may use the region Ro for the integration and may not use the region Ru for the integration. For example, the integration may be performed on the basis of the steering torque amount T that exceeds the right torque reference value TbR or the left torque reference value TbL in a direction away from the intermediate value of the right torque reference value TbR and the left torque reference value TbL, and the steering torque amount T that does not exceed the right torque reference value TbR or the left torque reference value TbL may not be used for the integration. The first modification example also helps to cancel the automatic steering without giving to the driver the sense of discomfort or with reduced sense of discomfort to be felt by the driver.

Second Modification Example

Figure 10:
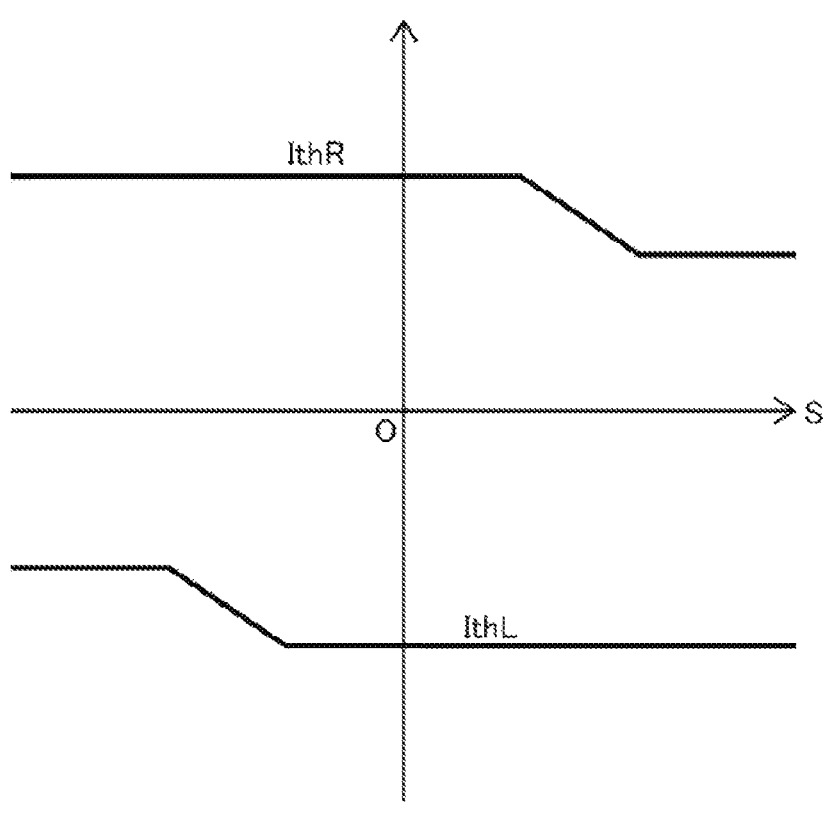
FIG. 10 is a graph illustrating an integration threshold that changes with respect to a steering amount, according to a second modification example.

In the example embodiment and the first modification example, the automatic steering may be cancelled in a case where the integration value exceeds the integration threshold. The integration threshold may be fixed. In some embodiments, the integration value may be changed on the basis of a state of the vehicle 1. The second modification example may change the integration threshold on the basis of a steering amount S as an example of the vehicle state. Other configurations may be similar to those of the example embodiment and the first modification example. FIG. 10 is a graph illustrating an example of a change in the integration threshold. In FIG. 10, a horizontal axis represents the steering amount S, in which the right steering corresponds to +(plus), and a vertical axis represents the integration threshold. The steering amount S may be an angle at which the steering wheel 2 and the steering shaft 3 are rotated from their respective regular positions at a timing at which a determination as to whether to cancel the automatic steering is to be made as a result of comparing the integration value with the integration threshold. As illustrated in FIG. 10, the right integration threshold IthR becomes small as the steering amount becomes large to some extent. Accordingly, the steering amount S that is large to some extent makes it easier to cancel the automatic steering. This applies similarly to the left integration threshold IthL as well. The configuration according to the second modification example further helps to cancel the automatic steering without giving to the driver the sense of discomfort or with reduced sense of discomfort to be felt by the driver.

The steering amount S according to the second example embodiment may be based on a traveling direction of the vehicle 1. In some embodiments, the traveling direction of the vehicle 1 may be obtained on the basis of a recognition, from an image acquired by the camera 9, of a line drawn on the road surface. In such embodiments, the image acquired by the camera 9 may be transmitted to the steering processor 8. The steering processor 8 may analyze the image and determine the traveling direction of the vehicle 1.

In the second modification example, the integration threshold may be changed on the basis of the steering amount S. In some embodiments, the integration threshold may be changed on the basis of a state of a traveling road as an example of the vehicle state. For example, the integration threshold may be changed from a case where the vehicle 1 travels straight while traveling on a curved road. The steering processor 8 may determine whether the vehicle 1 travels on a straight road or the curved road on the basis of an image acquired from the camera 9. For example, for a right curved road, the right integration threshold IthR and the left integration threshold IthL may be so changed as to be shifted in a + (plus) direction as compared with a case where the vehicle 1 travels on the straight road. The steering wheel 2 may be turned on the right side by the automatic steering in a case where the driver operates the right blinker on the right curved road. Shifting the right integration threshold IthR in the + direction as compared with the straight road helps to make it difficult to cause the cancellation of the automatic steering in a case where the driver has applied a force in the right direction to operate the steering wheel 2. This configuration in turn helps to make it easier to cause the cancellation of the automatic steering in a case where the driver has applied a force in a left direction, i.e., a direction of stopping the lane changes to operate the steering wheel 2. A force that turns the steering wheel 2 in the right direction is applied in response to the right turning of the steering wheel 2 following the operation of the blinker in a case where a hand of the driver is in contact with the steering wheel 2, causing the integration threshold to be biased in the + direction as described above. This helps to cancel the automatic steering on the basis an operational feeling same as that upon traveling on the straight road.

In the example embodiment and the modification examples described above, the right torque reference value TbR may be subtracted from the steering torque amount T to set the right torque amount TR, and the automatic steering may be cancelled to switch to the manual steering in a case where the right integration value IR in which the right torque amounts TR in the predetermined period P are added exceeds the right integration threshold IthR. In some embodiments, an amount corresponding to the right torque reference value TbR may be simply subjected to the subtraction upon making the determination as to whether the right integration value IR exceeds the right integration threshold IthR, without calculating the right torque amount TR for each acquisition time. The right integration value may be calculated by the integration with respect to the predetermined period in which the right torque reference value is subtracted from the steering torque amount, as long as the amount corresponding to the right integration threshold IthR is subtracted eventually. This applies similarly to the left torque as well. In the example embodiment and the modification examples described above, the steering torque amount T may not be stored in the memory 82. In some embodiments, the steering torque amount T may be stored for each acquisition time, and the integration with respect to the predetermined period P and the subtraction of the torque reference value may be performed upon making the determination as to whether the integration value exceeds the integration threshold. In such embodiments, the right integration value and the left integration value may be calculated by the integration with respect to the predetermined period in which the right torque reference value and the left torque reference value are subtracted from the steering torque amount.

In the example embodiment and the modification examples described above, described is an example of the automatic steering control apparatus in which the steering processor starts the control of the automatic steering directed to the lane changes on the basis of the operation of the blinker performed by the driver as a trigger to thereby make the lane changes. However, the application of the automatic steering control apparatus is not limited to the automatic steering described above. Any embodiment of the disclosure may be applied to any other automatic steering control apparatus configured to cancel the automatic steering and switch to the manual steering when the driver has operated the steering wheel, such as an automatic steering control apparatus based on a lane keep control. The process to be executed by the example embodiment or the modification example described above may be recorded as an automatic steering control program on a non-transitory computer readable recording medium.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof. Further, techniques according to the example embodiments and their modification examples described above may be combined in any combination unless any particular contradiction or issue occurs in terms of a purpose, a configuration, etc., thereof.

At least one embodiment of the disclosure helps to smoothly cancel an automatic steering control in a case where a driver who drives a vehicle attempts to perform a steering wheel operation by himself/herself, which helps to give to the driver a sense of discomfort. In addition, it helps to reduce or prevent the unintended cancellation of the automatic steering control even when the driver holds a steering wheel while the automatic steering control is in execution. Further, it helps to promptly cancel the automatic steering for a strong torque applied by the driver to make lane changes by himself/herself.

An example embodiment described above explains an example of an automatic steering control apparatus, an automatic steering control method, and a non-transitory recording medium containing an automatic steering control program in the case where the subject vehicle travels on a road where drivers keep to the left by law. Needless to say, if the automatic steering control apparatus, the automatic steering control method, and the non-transitory recording medium containing the automatic steering control program is to be applied to a road where drivers keep to the right by law, left and right settings or the like may be appropriately set in an opposite manner.

The steering processor 8 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the steering processor 8. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the steering processor 8 illustrated in FIG. 2.

The invention claimed is:

1. An automatic steering control apparatus comprising:
a steering torque detector configured to detect steering torque amounts applied to a steering shaft of a vehicle; and
a steering processor configured to:
start an automatic steering for a lane change in the vehicle;
calculate an integration value in which the steering torque amounts detected over a predetermined period by the steering torque detector are integrated; and
switch the automatic steering to a manual steering when the integration value exceeds an integration threshold while the automatic steering for the lane change is being performed.

2. The automatic steering control apparatus according to claim 1, wherein
the integration value comprises a right integration value and a left integration value,
the integration threshold comprises a right integration threshold and a left integration threshold, and
the steering processor is configured to calculate the right integration value by performing, for the predetermined period, an integration in which a right torque reference value is subtracted from the steering torque amount, and calculate the left integration value by performing, for the predetermined period, an integration in which a left torque reference value is subtracted from the steering torque amount.

3. The automatic steering control apparatus according to claim 2, wherein the steering processor is configured to perform the integration, based on the steering torque amount that exceeds the right torque reference value or the left torque reference value in a direction away from an intermediate value of the right torque reference value and the left torque reference value, and based on the steering torque amount that does not exceed the right torque reference value or the left torque reference value.

4. The automatic steering control apparatus according to claim 2, wherein the steering processor is configured to perform the integration, based on the steering torque amount that exceeds the right torque reference value or the left torque reference value in a direction away from an intermediate value of the right torque reference value and the left torque reference value, without using the steering torque amount that does not exceed the right torque reference value or the left torque reference value.

5. The automatic steering control apparatus according to claim 1, wherein the steering processor is configured to start the automatic steering for the lane change in response to an operation of a blinker as a trigger.

6. The automatic steering control apparatus according to claim 2, wherein the steering processor is configured to start the automatic steering for the lane change in response to an operation of a blinker as a trigger.

7. The automatic steering control apparatus according to claim 3, wherein the steering processor is configured to start the automatic steering for the lane change in response to an operation of a blinker as a trigger.

8. The automatic steering control apparatus according to claim 4, wherein the steering processor is configured to start the automatic steering for the lane change in response to an operation of a blinker as a trigger.

9. The automatic steering control apparatus according to claim 1, wherein the steering processor is configured to change the integration threshold, based on a state of a vehicle to which the automatic steering control apparatus is to be applied.

10. The automatic steering control apparatus according to claim 2, wherein the steering processor is configured to change the integration threshold, based on a state of a vehicle to which the automatic steering control apparatus is to be applied.

11. The automatic steering control apparatus according to claim 3, wherein the steering processor is configured to change the integration threshold, based on a state of a vehicle to which the automatic steering control apparatus is to be applied.

12. The automatic steering control apparatus according to claim 4, wherein the steering processor is configured to change the integration threshold, based on a state of a vehicle to which the automatic steering control apparatus is to be applied.

13. An automatic steering control method comprising:

starting an automatic steering for a lane change in a vehicle;

calculating, with a computer, an integration value in which steering torque amounts applied to a steering shaft of the vehicle over a predetermined period are integrated; and switching, with the computer, an automatic steering to a manual steering when the integration value exceeds an integration threshold while the automatic steering for the lane change is being performed.

14. A non-transitory computer readable medium containing an automatic steering control program, the automatic steering control program causing, when executed by a computer, the computer to implement a method, the method comprising:

starting an automatic steering for a lane change in a vehicle;

calculating an integration value in which steering torque amounts applied to a steering shaft of the vehicle over a predetermined period are integrated; and switching an automatic steering to a manual steering when the integration value exceeds an integration threshold while the automatic steering for the lane change is being performed.

\*   \*   \*   \*   \*